Patented Sept. 10, 1940

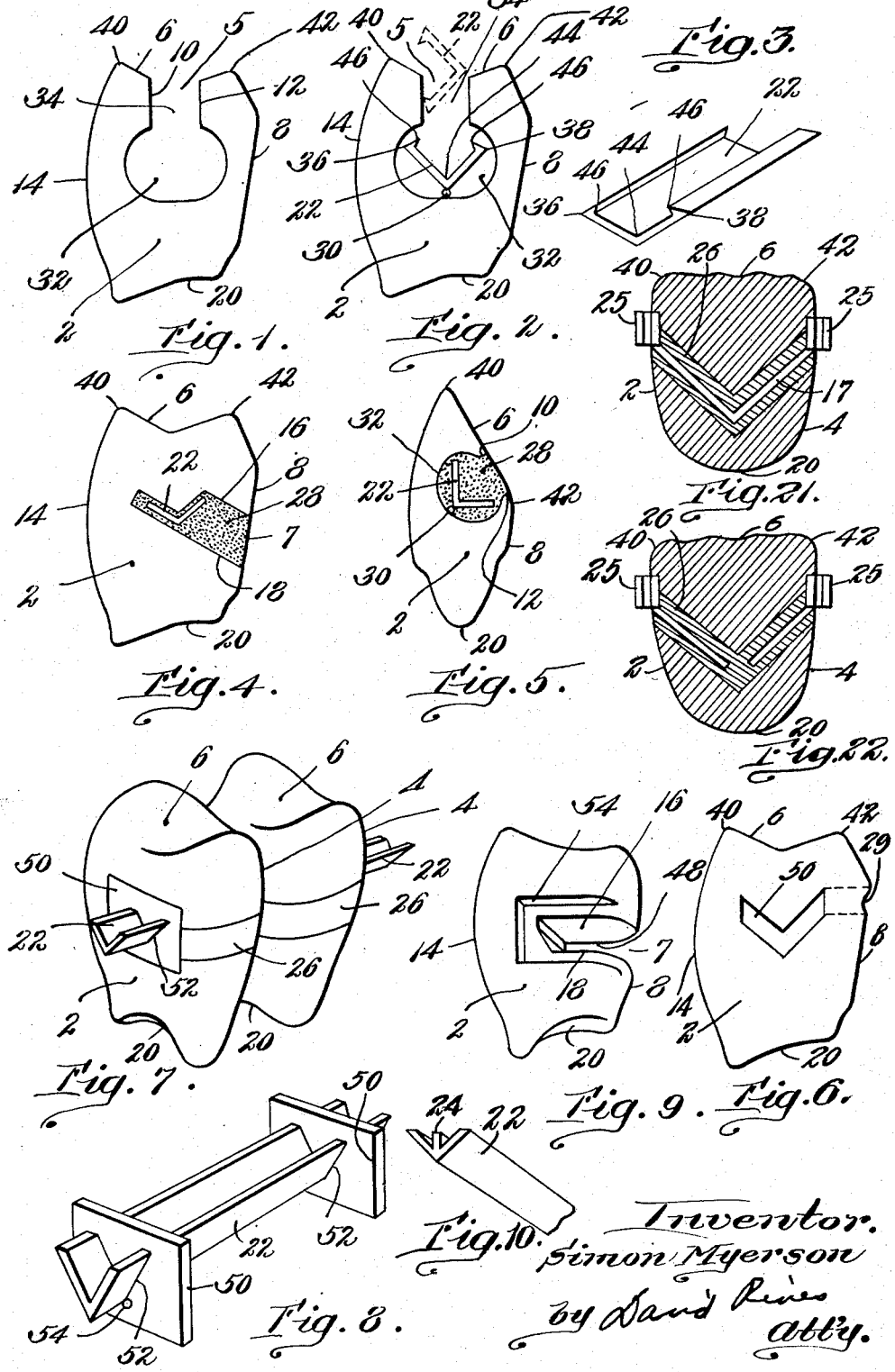

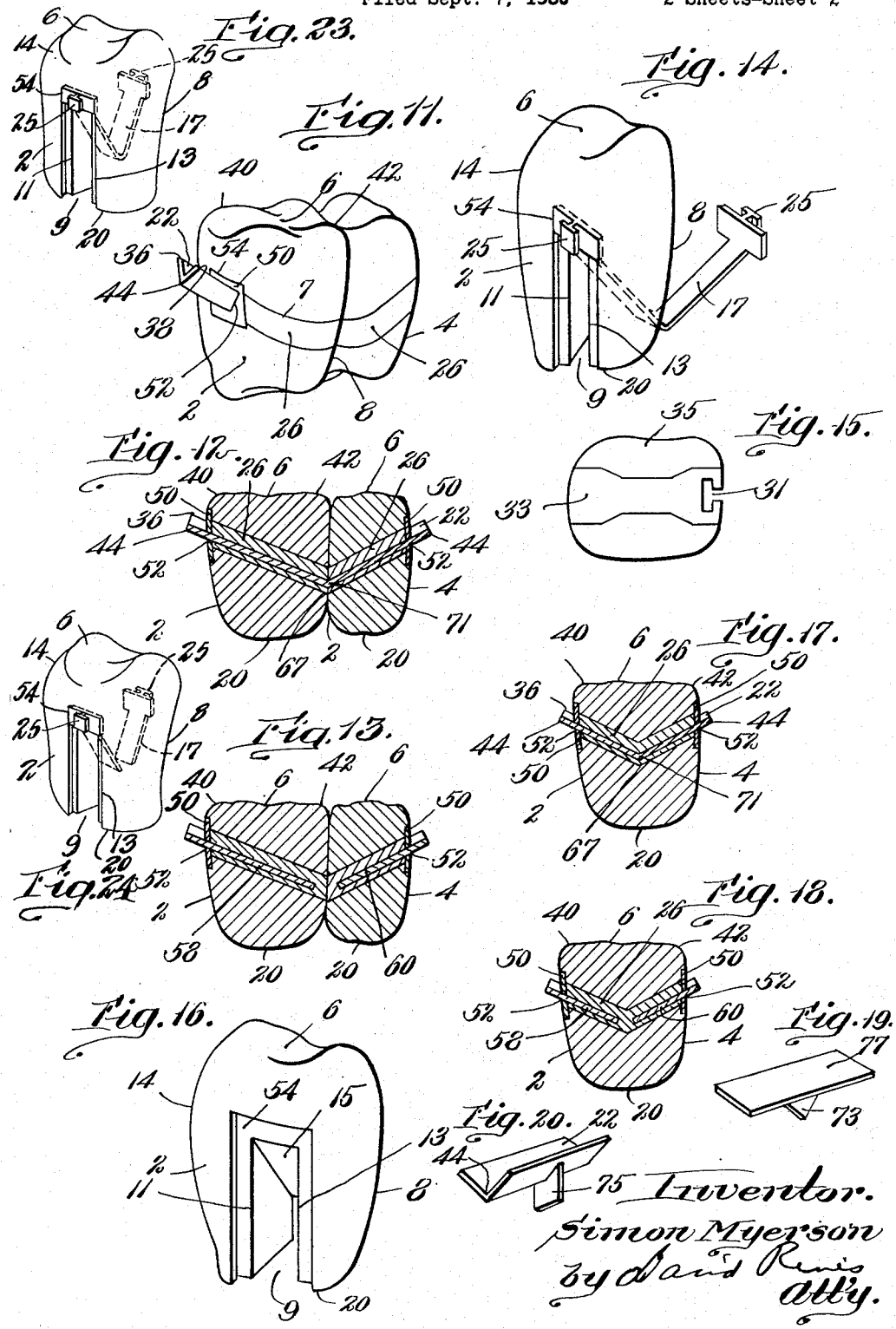

2,213,963

UNITED STATES PATENT OFFICE 2,213,963

ARTIFICIAL TOOTH AND METHOD OF MAKING THE SAME

Simon Myerson, Brookline, Mass.

Application September 7, 1935, Serial No. 39,580

27 Claims. (Cl. 32—10)

The present invention relates to artificial teeth, particularly porcelain teeth, and to methods of making the same.

According to present-day practice, after a model has been made of an area of a patient's mouth adjacent a missing tooth or teeth, and the ends of a transverse supporting bar have been secured to abutments on the model, a raw, porcelain mass is baked around the bar, after which the resulting product is replaced upon the model; a raw-porcelain layer is then applied, as a second approximation, around the baked, porcelain mass, after which, there is a second baking and a second fitting; and this process is continued until the tooth has attained the proper shape and size. Great skill and effort are required, lasting over a considerable time, and attended with some expense; and often, the tooth cracks before it is completed, because of the various strains to which the structure is subjected during successive bakings and coolings. Frequently two, or even more, porcelain teeth are thus formed around a common supporting bar to produce an integral bridge structure constituted of porcelain, except for the supporting bar, the latter being supported, at its ends, by the abutments; and if anything goes wrong with any part of this structure during any of the successive bakings, the bridge structure often becomes damaged beyond repair so that it must be completely discarded. Bridges constructed in this manner, furthermore, are difficult to fit properly.

Among the objects of the present invention are to improve upon artificial teeth and methods of making the same, to the ends of producing a better product, requiring but a single baking; and, though reducing the cost of construction, imparting to the bridge structure a maximum of strength and a superior restoration of the size and shape of the lost, natural teeth.

Another object is to provide a novel, stress-bearing support for teeth of the above-described character.

A further object is to increase the degree of lateral support of the artificial teeth, particularly near the buccal and lingual cusps, where the most dangerous stresses are encountered.

A further object is to make such structure interchangeable.

A still further object is to provide extended lateral supports, as later described.

Other and further objects will be explained hereinafter and will be particularly pointed out in the appended claims.

The invention will now be explained in connection with the accompanying drawings, in which Fig. 1 is a side elevation of a primary tooth body constructed in accordance with a preferred embodiment of the present invention, the tooth being shown as a bicuspid or molar; Fig. 2 is a similar view, illustrating, in dotted lines, the step of mounting a preferred supporting bar from the occlusal aspect of the tooth during construction, and showing, also, in full lines, the supporting bar in final position in the enlarged portion of the slot of the primary tooth body; Fig. 3 is a perspective of the supporting bar shown in Fig. 2; Fig. 4 is a view similar to Fig. 3, showing a modified slot, and illustrating the supporting bar either as temporarily waxed in position in the recess, or as mounted in a porcelain-slip filling; Fig. 5 is a similar view of an anterior, or front, tooth, similarly illustrating the bar; Fig. 6 is a view similar to Fig. 1 of a further modification, provided with an interior slot for encircling the supporting bar; Fig. 7 is a perspective of a preferred bridge structure comprising two modified porcelain teeth permanently mounted upon a supporting bar, the teeth being held between lateral plates in laterally inset recesses communicating with the slots of the teeth; Fig. 8 is a perspective of the bar of Fig. 7, with the lateral plates slidably positioned thereon, prior to assembly with the teeth; Fig. 9 is a perspective of one of the teeth shown in Fig. 7; Fig. 10 is a perspective similar to Fig. 3 of a modified supporting bar; Fig. 11 is a view similar to Fig. 7 of a modification showing a molar and a bicuspid, instead of two bicuspids; Fig. 12 is a mesial-distal section of the modification shown in Fig. 11; Fig. 13 is a similar section of a further modification; Fig. 14 is a perspective of a bicuspid primary tooth body in position at one end of a modified supporting bar; Fig. 15 is a plan of a tooth with an inlay, the inlay having a keyway slot for receiving a key on a lateral plate of the supporting bar shown in Fig. 14; Fig. 16 is a perspective of the tooth shown in Fig. 14, without the supporting bar; Fig. 17 is a section corresponding to Fig. 12, showing the invention embodied on a single tooth; Fig. 18 is a similar section of a single-tooth modification corresponding to Fig. 13; Figs. 19 and 20 are perspectives similar to Figs. 3 and 10 of modified supporting bars; Figs. 21 and 22 are sections corresponding to Figs. 17 and 18, respectively, of further modifications; and Figs. 23 and 24 are respectively corresponding perspectives.

In accordance with a preferred embodiment of the present invention, the completed tooth may comprise a primary, porcelain tooth body, as illustrated, for example, in Figs. 1, 6, 9 and 16, having a relatively narrow slot extending transversely of the tooth, between, say, its mesial face 2 and its distal face 4. The slot may assume any of a large number of shapes, and it may be of varying sizes. It may be formed in any desired way, as by previously baking the primary tooth body with the slot therein, or by subsequent cutting of the slot in an unslotted tooth. In Figs. 1, 2 and 5, the slot is shown as extending not only between the mesial and distal faces of the tooth, but as extending also to the occlusal face 6 of the tooth, the mouth of the slot being shown at 5; in Figs. 4, 7, 9, 11 to 13, 16 and 17, the slot is shown as extending to the lingual face 8, the mouth of the slot being shown at 7; in Figs. 14 and 16, the slot opens on the gingival face 20; and in Fig. 6, the slot does not open upon any of the teeth faces except the said mesial and distal faces, being otherwise disposed interiorly of the tooth body. All these and other forms and shapes of slots are within the scope of the present invention. The transverse slots need not extend in a direction generally parallel to the occlusal faces 6; as shown in Figs. 11, 12, 13, 17 and 18, they may be inclined in relation to the said occlusal faces 6. Any or all of the above forms may have complemental, inset, lateral recesses 54, as hereinafter more fully described.

The slot is intended to receive a supporting bar. This bar may have any desired shape, and several shapes are illustrated in another application, Serial No. 39,581, filed September 7, 1935. Differently shaped bars are resistant to forces in different directions. It is preferred, for reasons hereinafter stated, to employ a V shape, as shown at 22, though a reinforcing tang 24 may extend from the vertex of the V into the angle between the sides of the V, as shown in Fig. 10.

A peculiar advantage of the V-shaped bar, as used in my invention, is that wings may extend toward buccal and lingual cusps 40 and 42 and their margins brought close to these points, whilst the concavity of the bar permits considerable bulk of porcelain over its center. It is, therefore, feasible to use a broad U-shaped bar or arc, instead of a V. By the term V-shaped in the following claims, therefore, I include a U shape, or the segment of a circle, or any other form which is concaved from the occlusal face 6 of the tooth body or bodies. The V may be mesio-distal in its conformation, as well as bucco-lingual. This latter construction will result in a considerable increase in the strength of the porcelain bodies. The ends may have joint members integral therewith, or they may be joined thereto. The bar member may be continuous through the several tooth bodies. It may also protrude through only one lateral face, as the several porcelain teeth may be strongly united by the secondary porcelain. The exposed ends of the supporting bar may be fixed to abutments or other natural-tooth supports in the mouth in any desired way, several illustrations thereof being described in the said application.

The primary porcelain tooth body is then mounted upon the supporting bar, carried upon a suitably prepared model of parts of the mouth, with the bar lying in the said slots of the tooth bodies. The dentist adjusts the primary tooth body to the proper position on the supporting bar, after which he fills up the slot with a secondary porcelain tooth body 26, integrally uniting this secondary tooth body to the walls of the slot by baking or otherwise, with the supporting bar embedded in the secondary tooth body. An integral bridge structure is thus provided that, though constituted of three parts, namely, the primary tooth body, the secondary tooth body and the supporting bar, is as rigid and firm as a one-piece tooth structure. The shape and the size of the tooth are, however, predetermined by the shape and the size of the primary tooth body; so that if the dentist has properly prepared his primary tooth body, as by proper selection and grinding, all that he needs to do, to fit the space between the abutments and to meet properly the opposing teeth and to fit the gum ridge, is properly to adjust the primary tooth body upon the supporting bar before uniting the parts together. The dentist may also find it to be necessary to bend the supporting bar to proper shape. If these precautions are observed, haphazardness and guess work will be entirely eliminated, and it will be possible to provide a dental bridge having porcelain teeth of just the right size and shape, and properly positioned in the mouth.

It is now in order, therefore, to describe a preferred method of mounting the primary tooth body upon the supporting bar and integrally uniting the secondary tooth body thereto.

The supporting bar is first temporarily mounted upon the said suitably prepared model, with its ends fitting against the corresponding abutments or copings. As described in the said application, the supporting bar may be inserted in the said slot of the primary tooth body prior to uniting the said bar to the abutments; but, as will presently be explained, the primary tooth body may be so designed as to permit placing it upon the supporting bar at a later time. The supporting bar may have as many primary tooth bodies strung thereon as may be desirable; in Figs. 7, 11, 12 and 13, two such tooth bodies are shown. The tooth body or bodies are manually adjusted upon the supporting bar until they occupy the proper position with relation to the other teeth, the teeth bodies butting firmly against the gingival ridge of the model of the mouth and properly alined, particularly on their buccal faces, to the proper height, so as to contact the opposing teeth; after which, the dentist inserts a temporary holding material 26 in the slot. This temporary holding material, which may, for example, be melted wax, is inserted through the occlusal open mouth 5 of the slot or the lingual mouth 7; or if the slot has no mouth, through a separate bore opening 29, communicating with the slot through another face of the tooth, or through the gingival face opening 9, Figs. 14 and 16. By means of this wax, which may be poured into the slot, the primary tooth bodies will be held, in their manually adjusted position, firmly upon the supporting bar. All that remains to be done, therefore, is to remove from the model the supporting bar, with the primary tooth body or bodies temporarily waxed thereto, and to replace the wax by the secondary tooth body or bodies before described, but without changing the relative positions of the supporting bar and the teeth mounted thereon.

A preferred method of holding the supporting bar and the primary tooth bodies in relatively fixed position is explained in the said application, and need not be described at great length herein, as the present invention is not restricted to any particular method of bringing about this desired result. The waxed structure is there described as held together in a temporary, plaster of Paris, retainer mold, while hot water is applied to melt out the wax. The plaster of Paris mold continues to hold the supporting bar and the primary tooth body or bodies in proper relative position after the wax has thus been melted out.

In whatever way these parts are thus held together, properly positioned, the next step is to fill the slot or slots in the primary tooth body or bodies with raw porcelain, and to pack it about the supporting member, so as to embed the latter therein. This may be effected through the same mouth 6 or 7 of the slot, or the gingival opening 9, or the said opening 29. A slip may be used for this purpose, consisting of a soft, though easily flowing, paste made of powdered porcelain and water. The slip may be applied with a fine, wet brush. The plaster of Paris mold, if used, will serve also to extract much of the water of the slip, so as to leave the slot or slots filled with quite a consistent, porcelain mass, but the slip may be dried also without the aid of the plaster of Paris. The numeral 28 of Fig. 4 or 5 may represent the slip, instead of the wax, as the supporting bar will occupy the same position in the wax as in the slip.

The next step is to bake the structure, which is removed for this purpose from the plaster of Paris retainer and placed carefully on a silex tray, which is then carefully brought into a furnace. In order to withstand the baking heat, the supporting bar may be made of platinum or a platinum-iridium alloy, or the like. As the porcelain slip becomes baked, it becomes integrally united to the walls of the slot, producing the beforementioned, secondary, porcelain tooth body, with the supporting member embedded therein and adhering firmly thereto. The resulting structure is almost indistinguishable from a tooth that has been originally formed in a single piece.

The advantages of having the slot narrow will now be understood. The narrower this slot, the more of the porcelain of the primary tooth body, and the less the porcelain slip, that is disposed between the walls 10 and 12 (Figs. 1, 2 and 5) or 16 and 18 (Figs. 4, 7 and 9) thereof. There will therefore be less shrinkage strains, easier molding to form, and less likelihood of need to rebake.

During the baking, the porcelain slip will shrink; and so also, of course, will the primary tooth body, notwithstanding the fact that it had already once been previously baked; but the degree of shrinkage is markedly different, for the porcelain slip will shrink to a considerable extent and the primary tooth body to a very slight extent. It is preferred to use a primary tooth body that is originally slightly underburnt. The narrower the slot, the less the strains introduced against the walls 10 and 12 or 16 and 18 of the slot during this shrinkage; with the result that there is less chance of these strains resulting in cracking of the tooth during baking.

It is a great advantage of the present invention that but a single baking is required, as further bakings may involve risk of damage and distortion of the porcelain tooth body. This single baking secures the teeth not only to the bar 22, but also to each other at their contacting sides. If desired, however, the supporting bar may have a lining of porcelain previously baked therearound, before it is positioned in the slot.

These strains may be further reduced, however, by providing a relatively small space in the slot into which none of the porcelain slip is packed. This space may, for example, be occupied by a wire or other obstruction 30, waxed or otherwise detachably positioned in the slot, preferably at the vertex of the V, prior to the pouting of the slip. The obstruction 30 may be removed prior to the baking step; or, if the obstruction 30 is constituted of thread, a sliver of wood, or other combustible material, it will automatically burn out during the baking, without the necessity for previous removal.

In all of the forms except that shown in Fig. 6, the bar may be joined to the abutments before baking, and the primary teeth bodies then positioned as before described.

The baked structure is then replaced upon the model, and the case is invested so as completely to cover the porcelain teeth and to retain the several parts in their proper positions. The ends of the supporting bar are soldered to the copings or other abutments, or they may be made integral with a key 25 that is adapted to be positioned in the keyways 31 in an inlay 33. In the form shown in Fig. 14, the keys 25 are integral with the lateral plates 54. The key construction makes it possible to replace a broken bridge work more readily. The porcelain jackets may then be fitted to the copings, the jackets having lateral openings on the sides where the copings join the bar.

Though, in Fig. 14, I show the lateral plates as having a headed key member 25 on one of its faces and, in Fig. 15, an abutment with a complemental keyway 31, the construction can readily be reversed; that is, the keyway may be formed in the lateral plates and the key upon any abutment form.

As a variation, the bar may be soldered to the copings and the jackets constructed and put into place. The jackets and the tooth dummies may all be joined to each other by the porcelain slip, as above described. When inlay abutments are employed, the joint members may be soldered to the bar after the tooth bodies are in position.

In Figs. 7, 11, 12, and 13, a plurality of primary tooth bodies are joined to form the porcelain member of the bridge. I shall therefore refer to the united primary tooth bodies as a porcelain member. The porcelain members shown in Figs. 11, 12 and 13 have a slot that is V-shaped mesio-distally though the slot in each primary tooth body is straight or curved, but inclined gingivally, the V being formed at the junction of the two slots 67. The supporting V bar is complemental, being straight or curved in each primary tooth body, its vertex 71 lying between the said primary bodies and near to their gingival faces.

Fig. 19 is a perspective of a flat supporting bar having a gingivally projecting arm 73, and Fig. 20 is a perspective of a V-shaped supporting member having a downwardly projecting arm 75. Obviously, either arm 73 or 75 may be used upon either bar 22 or 77. The greatest danger of fracture to the porcelain bodies or the porcelain member in use arises from the fact that the supporting member is held relatively fixed by the abutments whilst forces applied buccally or lingually on the dummies will tend to rotate the teeth upon the bar accordingly.

The projecting arms 73 and 75 will operate to prevent said rotation. The arm 73 shown on the flat bar 77 is preferably angular in shape and is designed also to prevent bending of the bar gingivally. The projecting arms 73 or 75 whilst shown as preferably projecting gingivally may extend occlusally. Though this would weaken the tooth on the side which receives the stresses of mastication, it would, however, support the tooth against rotation.

So narrow a slot, though having the above-described advantages, would be subject to the disadvantage that it could hold only a correspondingly narrow supporting bar. According to a feature of the present invention, therefore, the slot may be terminally widened out into an enlarged bore 32, in an inner portion of the tooth, spaced substantially from the occlusal or other mouth 5 or 7. The body portion 34 of the slot, between the walls 10 and 12 or 16 and 18, may be narrow, for the reasons before given; but the enlarged bore 32 will be considerably wider. The supporting bar may be so shaped as to have a portion both in the body portion 34 of the slot and in the bore 32, as described in the said application.

One of the features of the present invention consists in making the bore 34 wider than is described in the said application, in order to permit the use of a correspondingly wider supporting bar. The bar may be made so wide that the extremities 36 and 38 of its sides may respectively be positioned substantially, or very near to, under the buccal cusp 40 and the lingual cusp 42 of the primary tooth body. The supporting bar then serves to yield great support at points, namely, the buccal and lingual cusps 40 and 42, where the greatest strains are encountered. The enlarged bore is positioned as close to the occlusal surface 6 as possible, in order that the bar may be relatively close to the points of application of the forces encountered in biting and chewing, but it should be far enough from the occlusal surface 6 so as to provide a sufficient thickness of porcelain at all critical points above the supporting bars 22. The width of the supporting bar, between the said side extremities 36 and 38, is naturally greater than the width of the narrow body portion 34 of the slot, between the walls 10 and 12, but less than the width of the bore; whereas, the height of the supporting bar is less than the distance between the walls of the narrow body portion of the slot.

As shown in Figs. 12 and 17, the thickness of the porcelain at the interior portions of the tooth may be increased by bending the bar downward, into a V, with a vertex at 67; or two separate, oppositely inclined bars 58 and 60 may be provided, inclining downward toward each other, as illustrated in Figs. 12 and 18. Figs. 17 and 18 are sections corresponding to Figs. 13 and 12, respectively, for but a single tooth. In the modifications illustrated by Figs. 11 to 13, 17 and 18, it is not essential that the bars be V-shaped bucco-lingually, for even bars that are flat bucco-lingually, as illustrated in Fig. 14 at 17, will operate very satisfactorily, because of their inclined position and the intermediate bending. The ends of the bent bars are nearer to the occlusal faces 6 and the bent portions of the bars nearer the gingival faces 20, with corresponding functions even when the separate bars 58 and 60 are used.

It is obvious, also, that I may employ the V bar whose vertex 67 is near the gingival face 20 with any form of bar or slot which I have shown in this or the said application or in any other modification.

By reference to Figs. 11, 12, 13, 17 and 18, it will be seen that not only is the bulk of the porcelain between the bar and the occlusal surface even more increased than by the bucco-lingually directed V of Fig. 7, for example, but, also, the tooth body is more firmly seated on the supporting bar and has greater resistance to tilting strains and also the bar thus underslung will not bend in the middle, at 67, under vertical strain, after its ends have been joined to the abutments.

In the forms illustrated in Figs. 1 to 9, inclusive, it is preferred to make the bar 22 V-shaped or U-shaped bucco-lingually instead of flat, as this shape yields strength in an up-and-down, or vertical direction, between the occlusal and gingival faces 6 and 20, as well as in a horizontal direction, between the buccal and lingual faces 14 and 8. The vertex 44 of the V is positioned at the bottom of the enlarged bore 32, with the side extremities 36 and 38 of the V substantially horizontal. The vertical height of the V, from the vertex 44 to the line joining the said extremities 36 and 38, is made less than the width of the body portion 34 of the slot, between the faces 10 and 12. By tilting the bar into the dotted-line position of Fig. 2, therefore, it is possible readily to insert it into the bore or, if the bar is held stationary, the primary tooth body may be tilted to mount it on the bar. A reverse tilt, from the dotted-line position to the full-line position of Fig. 2, will result in seating the bar in the enlarged bore 32, with the said extremities 36 and 38 substantially under the buccal and lingual cusps 40 and 42, as before described.

As before stated, the additional reinforcing tang 24 may be employed if further strength is desired. The supporting bar may be provided further with anchoring hooks 46, shown longitudinally disposed at the side extremities 36 and 38.

In Figs. 1, 2 and 5, the enlarged bore 32 is shown more or less oval shaped. The portion of the slot that receives the supporting bar may, however, have other shapes. In Fig. 9, the slot 48 is shown rectangular, and is well adapted to receive a V-shaped bar provided with the tang 24, illustrated in Fig. 10. The slot may, however, be V-shaped; it may extend between the mesial and distal faces, as illustrated at 50 in Fig. 6. According to this modification, it is necessary to thread the tooth body on the supporting bar before uniting the bar to the abutments. A V-shaped slot may, however, be provided, as illustrated in Fig. 4, with the use of which the primary tooth body may be mounted on the supporting bar after the latter has been united to the abutments. Preferably, the walls 16 and 18 are substantially parallel to the walls of the left wing of the V-shaped slot.

In Figs. 14 and 16, the gingival slot 9 is provided with substantially parallel walls 11 and 13 and an inclined wall 15 substantially parallel to the bucco-lingually flat supporting member 17. It will also be understood that the bar of Fig. 14, though shown flat, may be round or oval between the lateral plates.

A further feature of this invention is to provide the supporting member with side or lateral plates 50. These lateral plates may, if desired, be soldered to the V-shaped bar, they may be formed as described in the said application, or they may be formed integrally from the bar metal, as shown in Fig. 14. According to the forms described in Fig. 8, however, the lateral plates are provided with correspondingly V-shaped recesses 52 into which the supporting bars fit and through which they may extend. Lateral plates of this character are adjustable upon the supporting bar, and may be fixed in adjusted position thereon. The lateral plate may be provided with small holes 54 at the vertices of the V-shaped recesses 52 by which the obstructions 30 may be retained in position and through which they may be removed, if combustible.

The lateral plates serve to reinforce the V plates against distortion under stress. Each lateral plate is preferably received into the shallow recess 54, inset laterally in the distal or medial side of the primary tooth body, and communicating with the slot. It may be necessary to fit the plate into the recess. The lateral plates may form a further support for the porcelain tooth body or bodies, providing extended lateral supports against the stresses of mastication. I prefer to wax the teeth to the bar, trim the wax away from the inset faces, carefully fit the plates into the inset faces, invest the piece so as to hold the lateral plates, if said plates are not integral with the bar, in position upon the bar, and secure them to the bar by soldering. I use pure gold in soldering these lateral plates to the bars.

When a plurality of teeth are mounted upon a common, supporting bar, one of the teeth will have a recess 54 in its mesial face and another tooth in its distal face. For convenience, the primary tooth bodies, however, are made with both mesial and distal inset faces.

In Fig. 7, for example, one plate 50 is shown set into a recess 54 in the mesial face 2 of the first bicuspid, and another plate 50 will be set into a corresponding recess in the distal face 4 of the second bicuspid. The ends of the V-shaped bar 22 will then be cut flush with the lateral plates and joined to the abutments.

Though I show inset lateral faces in Figs. 7, 9, and 11 to 18 only, it is obvious that they will be effective in any or all of the forms shown or suggested in the above specification.

The present invention provides, therefore, an exceedingly strong and convenient porcelain bridge structure, substantially all the exposed portions of the teeth of which are of porcelain, and that is provided with a transversely disposed bar, extending from side to side of the bridge as substantially an integral part of the bridge and that is adapted to be secured, at its ends, to abutments or other parts that are adapted to be permanently positioned in the mouth. The porcelain teeth are supported in such manner as to resist successfully the most forceful stresses that are encountered in practice, particularly the stresses at the buccal and lingual cusps. The supporting bar, V-shaped bucco-lingually or mesio-distally, or both, and the lateral plates 50 seated in the laterally inset recesses 54 in the tooth body, aid in seating the tooth firmly, so as to withstand all tilting forces. The parts preferably have relative dimensions and shapes such that the primary tooth body may be conveniently mounted upon the bar 22, by way of the mouth 5, 7 or 9, through the narrow slot, and moved into proper position in the bar, while the bar is temporarily mounted upon the model. The said narrow slot may be occlusal, as shown in Figs. 1 and 2, lingual, as illustrated in Figs. 4, 5, 7, 9 and 11 to 13, interior, as illustrated in Fig. 6, or gingival, Figs. 14 and 16; and it may also have other lateral openings, as buccal (not illustrated).

Further modifications will occur to persons skilled in the art, and all such are considered to fall within the spirit of the invention, the scope of which is defined in the appended claims.

What is claimed is:

1. An artificial tooth constituted of porcelain and comprising a primary porcelain tooth body and a secondary porcelain tooth body integrally baked together, the primary tooth body having a slot extending transversely of the tooth between two oppositely disposed faces, the slot having an interiorly disposed body portion and a reduced portion each provided with oppositely disposed walls, the reduced portion opening upon a face of the tooth, the distance between the oppositely disposed walls being less at the reduced portion than at the interiorly disposed body portion, and a supporting member in the slot, the secondary porcelain tooth body being disposed in and integrally united to the walls of the slot, and the supporting member being embedded in and integrally united to the secondary tooth body.

2. An artificial tooth comprising a primary porcelain tooth body having a slot extending transversely of the tooth between its mesial and distal faces, the slot having a body portion and an enlarged bore, a supporting member in the bore of width greater than the width of the body portion of the slot, and a secondary porcelain tooth body integrally united to the walls of the slot and in which the supporting member is embedded.

3. An artificial tooth comprising a primary porcelain tooth body having a slot extending transversely of the tooth between its mesial and distal faces, the slot having a body portion and an enlarged bore, a supporting member in the bore of width greater than the width of the body portion of the slot and having a thickness less than the width of the body portion of the slot, and a secondary porcelain tooth body integrally united to the walls of the slot and in which the supporting member is embedded.

4. An artificial tooth constituted of porcelain and comprising a primary porcelain tooth body and a secondary porcelain tooth body integrally united together, the primary tooth body having a slot extending transversely of the tooth between its mesial and distal faces, the slot having an interiorly disposed body portion and a reduced portion each provided with oppositely disposed walls, the reduced portion opening upon the occlusal face of the tooth between its lateral faces, the distance between the oppositely disposed walls being less at the reduced portion than at the interiorly disposed body portion, a supporting member or members in the slot of width greater than the width of the reduced portion of the slot having portions respectively substantially under the buccal and lingual cusps of the primary tooth body, the secondary porcelain tooth body being disposed in and integrally united to the walls of the slot, and the supporting member or members being embedded in and integrally united to the secondary tooth body.

5. An artificial tooth constituted of porcelain and comprising a primary porcelain tooth body and a secondary porcelain tooth body integrally united together, the primary tooth body having a slot extending transversely of the tooth between its mesial and distal faces, the slot having an interiorly disposed body portion and a reduced portion each provided with oppositely disposed walls, the reduced portion opening upon the occlusal face of the tooth between its lateral faces, the distance between the oppositely disposed walls being less at the reduced portion than at the interiorly disposed body portion, a V-shaped supporting member in the slot of width greater than the width of the reduced portion of the slot, the wings of the V-shaped supporting member extending toward and being disposed substantially under the buccal and lingual cusps of the primary tooth body, the vertex of the V being disposed near the gingival face of the primary tooth body, the secondary porcelain tooth body being disposed in and integrally united to the walls of the slot, and the supporting member being embedded in and integrally united to the secondary tooth body.

6. An artificial tooth constituted of porcelain and comprising a primary porcelain tooth body and a secondary porcelain tooth body integrally baked together, the primary tooth body having a slot extending transversely of the tooth between its mesial and distal faces, the slot having a body portion and a reduced portion, the reduced portion opening upon the occlusal face of the tooth between its lateral faces, the secondary porcelain tooth body being disposed in and integrally united to the walls of the slot, and a supporting member embedded in and integrally united to the secondary tooth body.

7. An artificial tooth constituted of porcelain and comprising a primary porcelain tooth body and a secondary porcelain tooth body integrally baked together, the primary tooth body having a slot extending transversely of the tooth between its mesial and distal faces, the slot having a body portion and provided with oppositely disposed walls and having an enlarged bore in an inner portion of the tooth, a supporting member in the enlarged bore having portions respectively substantially under the buccal and lingual cusps of the primary tooth body, the secondary porcelain tooth body being disposed in and integrally united to the walls of the slot, and the supporting member being embedded in and integrally united to the secondary tooth body.

8. A method of making an artificial tooth that comprises inserting a supporting member in the slot of a slotted primary porcelain tooth body, inserting a temporary obstruction in the slot, filling the slot with a porcelain slip, removing the obstruction, and applying heat to cause the porcelain slip to harden into a secondary tooth body with the supporting member embedded therein and to become integrally united to the walls of the slot.

9. A method of making an artificial tooth that comprises providing a primary porcelain tooth with a slot, inserting a supporting member in the slot, inserting a combustible obstruction in the slot, filling the slot with a porcelain slip, and applying heat to burn out the obstruction and to cause the porcelain slip to harden into a secondary tooth body with the supporting member embedded therein and to become integrally united to the walls of the slot.

10. An artificial tooth constituted of porcelain and comprising a primary porcelain tooth body and a secondary porcelain tooth body integrally baked together, the primary tooth body having a V-shaped slot, the vertex of the V being near the gingival end of the primary tooth body and the ends of the V near the occlusal surface thereof, the secondary tooth body being disposed in and integrally united to the walls of the slot, and a supporting member or members embedded in and integrally united to the secondary tooth body, with the ends of the supporting member or members disposed substantially near to the occlusal face of the tooth and other portions of the supporting member or members disposed substantially near the gingival face of the tooth.

11. An artificial tooth constituted of porcelain and comprising a primary porcelain tooth body and a secondary porcelain tooth body integrally baked together, the primary tooth body having a slot extending transversely of the tooth between its mesial and distal faces and provided with oppositely disposed walls, a V-shaped supporting member in the slot, the wings of the V-shaped supporting member extending toward and being disposed substantially under the buccal and lingual cusps of the primary tooth body, the vertex of the V being disposed near the gingival face of the primary tooth body, the secondary porcelain tooth body being disposed in and integrally united to the walls of the slot, and the supporting member being embedded in and integrally united to the secondary tooth body.

12. An artificial tooth constituted of porcelain and comprising a primary porcelain tooth body and a secondary porcelain tooth body integrally united together, the primary tooth body having a slot extending transversely of the tooth between its mesial and distal faces, the slot having an interiorly disposed body portion and a reduced portion each provided with oppositely disposed walls, the distance between the oppositely disposed walls being less at the reduced portion than at the interiorly disposed body portion, a supporting member or members in the slot of width greater than the width of the reduced portion of the slot having portions respectively substantially under the buccal and lingual cusps of the primary tooth body, the secondary porcelain tooth body being disposed in and integrally united to the walls of the slot, and the supporting member or members being embedded in and integrally united to the secondary tooth body.

13. An artificial tooth comprising a primary porcelain tooth body having a slot extending transversely of the tooth body between two oppositely disposed faces thereof, the slot having oppositely disposed walls, a secondary porcelain tooth body disposed in the slot and integrally baked to the walls of the slot, and a supporting member embedded in the secondary tooth body in the slot and integrally baked to the secondary tooth body.

14. An artificial tooth comprising a primary porcelain tooth body having a slot extending transversely of the tooth body between its mesial and distal faces, the slot having oppositely disposed walls, a secondary porcelain tooth body disposed in the slot and integrally baked to the walls of the slot, and a supporting member or members embedded in the secondary tooth body in the slot and integrally baked to the secondary tooth body, the supporting member or members having portions respectively substantially under the buccal and lingual cusps of the primary tooth body.

15. An artificial tooth comprising a primary porcelain tooth body having a slot extending transversely of the tooth body between its mesial and distal faces, the slot having oppositely disposed walls, a secondary porcelain tooth body disposed in the slot and integrally baked to the walls of the slot, and a supporting member embedded in the secondary tooth body in the slot and integrally baked to the secondary tooth body.

16. An artificial-tooth structure comprising a plurality of primary porcelain tooth bodies, each tooth body having a slot extending transversely thereof between its mesial and distal faces, the slots being alined and each having oppositely disposed walls, a secondary porcelain tooth body disposed in each of the slots and integrally baked to the walls of the respective slots, and a supporting member embedded in the secondary tooth bodies in the slots and integrally baked to the secondary tooth bodies.

17. An artificial tooth comprising a primary porcelain tooth body having a slot extending transversely of the tooth body between its mesial and distal faces and extending also to another face of the tooth, a secondary porcelain tooth body disposed in the slot and integrally baked to the walls of the slot, and a supporting member embedded in the secondary tooth body in the slot and integrally baked to the secondary tooth body.

18. A method of making an artificial tooth that comprises filling with a porcelain slip the slot of a primary porcelain tooth body provided with a slot extending transversely of the tooth body between two oppositely disposed faces thereof, embedding a supporting member in the porcelain slip in the slot, and applying heat to bake the primary porcelain body with the porcelain slip and the supporting member in the slot thereof to cause the porcelain slip to become baked into a secondary porcelain tooth body integrally united to the walls of the slot with the supporting member embedded therein.

19. A method of making an artificial tooth that comprises filling with a porcelain slip the slot of a primary porcelain tooth body provided with a slot that extends transversely of the tooth body between two oppositely disposed faces thereof and that has an enlarged bore in an inner portion of the tooth body, embedding in the porcelain slip in the bore a supporting member having a width greater than the width of the body portion of the slot but less than the width of the enlarged bore, and applying heat to bake the primary porcelain body with the porcelain slip and the supporting member in the slot thereof to cause the porcelain slip to become baked into a secondary porcelain tooth body integrally united to the walls of the slot with the supporting member embedded therein.

20. An artificial tooth comprising a primary porcelain tooth body having a slot extending transversely of the tooth body between two oppositely disposed faces thereof, the slot having oppositely disposed walls, a secondary porcelain tooth body disposed in the slot and integrally baked to the walls of the slot, and a supporting member embedded in the secondary tooth body in the slot and integrally baked to the secondary tooth body, the ends of the supporting member being disposed substantially near to the occlusal face of the tooth and another portion of the supporting member being disposed substantially near to the gingival face of the tooth.

21. An artificial tooth comprising a primary porcelain tooth body having a V-shaped slot, the vertex of the V being near the gingival end of the tooth body and the ends of the V near the occlusal surface thereof, the slot having oppositely disposed walls, a secondary porcelain tooth body baked to the walls of the slot, and a supporting member embedded in the secondary tooth body in the slot and integrally baked to the secondary tooth body.

22. An artificial tooth comprising a primary porcelain tooth body having a V-shaped slot, the ends of the V opening on its mesial and distal faces, the slot having oppositely disposed walls, a secondary porcelain tooth body baked to the walls of the slot, and a supporting member embedded in the secondary tooth body in the slot and integrally baked to the secondary tooth body.

23. An artificial tooth comprising a primary porcelain tooth body having a V-shaped slot, the ends of the V opening into lateral recesses of the tooth body, the slot having oppositely disposed walls, a secondary porcelain tooth body baked to to walls of the slot, and a supporting member embedded in the secondary tooth body in the slot and integrally baked to the secondary tooth body.

24. An artificial tooth comprising a primary porcelain tooth body having a slot extending transversely of the tooth body between two oppositely disposed faces thereof, the slot having oppositely disposed walls, a secondary porcelain tooth body disposed in the slot and integrally baked to the walls of the slot, and a V-shaped supporting member embedded in the secondary tooth body in the slot and integrally baked to the secondary tooth body, the supporting member having integral lateral plates.

25. An artificial tooth comprising a primary porcelain tooth body having a slot extending transversely of the tooth body between two oppositely disposed faces thereof, the slot having oppositely disposed walls, a secondary porcelain tooth body disposed in the slot and integrally baked to the walls of the slot, and a V-shaped supporting member embedded in the secondary tooth body in the slot and integrally baked to the secondary tooth body, the supporting member having integral lateral plates, one or more of the plates having a key member on one of its faces.

26. An artificial tooth comprising a primary porcelain tooth body having a slot extending transversely of the tooth body between two oppositely disposed faces thereof, the slot having oppositely disposed walls and a shallow lateral inset recess, a secondary porcelain tooth body disposed in the slot and integrally baked to the walls of the slot, and a supporting member embedded in the secondary tooth body in the slot and integrally baked to the secondary tooth body, the supporting member having a lateral plate fitting in the recess.

27. An artificial tooth-structure comprising a plurality of primary porcelain tooth bodies provided with aligned slots extending transversely of the tooth bodies between oppositely disposed faces thereof, the slots having oppositely disposed walls, a secondary porcelain tooth body disposed in each of the slots and integrally baked to the walls of the respective slots, and a supporting member embedded in the secondary tooth bodies in the slots and integrally baked to the secondary tooth bodies.

SIMON MYERSON.